(12) United States Patent
Ringwald et al.

(10) Patent No.: US 6,587,069 B2
(45) Date of Patent: Jul. 1, 2003

(54) DISTRIBUTED POWER AMPLIFIER ARCHITECTURE FOR TCAS TRANSMITTER

(75) Inventors: Rand Ringwald, Newcastle, WA (US); Ruy L. Brandao, Ft. Lauderdale, FL (US); Ruy C. Brandao, Redmond, WA (US); James B. Jones, Carnation, WA (US); Dang Pham, deceased, late of Issaquah, WA (US); by Lien Nguyen, legal representative, Orlando, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/834,590

(22) Filed: Apr. 13, 2001

(65) Prior Publication Data

US 2002/0014986 A1 Feb. 7, 2002

Related U.S. Application Data

(60) Provisional application No. 60/197,131, filed on Apr. 14, 2000.

(51) Int. Cl.[7] .......................... G01S 13/00; G01S 13/74; G01S 13/08
(52) U.S. Cl. .............................. 342/30; 342/42; 342/43; 342/51
(58) Field of Search ............................... 342/30, 29, 42, 342/43, 46, 51, 454–456

(56) References Cited

U.S. PATENT DOCUMENTS

| | | | | |
|---|---|---|---|---|
| 4,855,748 A | | 8/1989 | Brandao et al. ............. 342/455 |
| 4,975,708 A | * | 12/1990 | Stayton ...................... 342/374 |
| 5,521,817 A | * | 5/1996 | Burdoin et al. ............. 364/423 |
| 5,712,628 A | * | 1/1998 | Phillips et al. ......... 340/825.54 |
| 5,721,552 A | * | 2/1998 | Rossius et al. ............... 342/51 |
| 5,864,301 A | * | 1/1999 | Jackson ................. 340/825.54 |
| 6,018,644 A | * | 1/2000 | Minarik ....................... 455/82 |
| 6,122,492 A | * | 9/2000 | Sears ......................... 455/127 |

OTHER PUBLICATIONS

Albert D. Helfrick, Modern Aviation Electronics, *Surveillance Systems*, Second Edition, Ch. 6, 1994, pp. 234–296.
Dale R. Cundy, et al., Transponder ATCTX, *Introduction to Avionics*, Ch. 10, 1997, pp. 85–100.
Dale R. Cundy, et al., Transponder ATCTX, *Traffic Alert and Collision Avoidance TCAS*, Ch. 11, 1997, pp. 101–107.

* cited by examiner

*Primary Examiner*—Thomas H. Tarcza
*Assistant Examiner*—Brian K Andrea
(74) *Attorney, Agent, or Firm*—Honeywell International Inc.

(57) ABSTRACT

A transmitter and method for transmitting transponder or TCAS signals uses linear amplification to save on circuit component weight, cost and size while enabling precise amplification and control of the transmitted signal.

24 Claims, 10 Drawing Sheets

DISTRIBUTED POWER AMPLIFIER ARCHITECTURE FOR TCAS TRANSMITTER

CROSS-REFERENCES TO RELATED APPLICATIONS

This application claims priority from co-pending U.S. application Ser. No. 60/197,131, titled, "Distributed Power Amplifier Architecture for TCAS Transmitter," filed Apr. 14, 2000, the entire contents of which are incorporated herein by reference.

BACKGROUND OF THE INVENTION

The present invention relates generally to transmitters used in aircraft transponders and in particular to transmitters used in connection with a Traffic Alert and Collision Avoidance System, or TCAS.

Pilots primarily rely on "see and avoid" techniques to prevent mid air collisions between aircraft. Various avionics systems also aid the pilot and air traffic control in maintaining aircraft separation. These systems, generally known as surveillance systems, may include: transponders and/or collision avoidance systems that exchange aircraft data between aircraft and/or between aircraft and air traffic control.

Transponders are transmitters/receivers located aboard aircraft. The transponder transmits a 1090 MHz encoded message containing information about the aircraft in response to interrogation signals received from a ground based radar or other TCAS equipped aircraft. This radar, known as a "secondary surveillance" radar, or simply secondary radar, transmits an interrogation signal at 1030 MHz. The interrogation signal contains three pulses. The time interval between the first and third pulses determine what type of information is requested: eight microseconds for identification; and twenty one microseconds for altitude. If the aircraft transponder is a Mode A transponder, the transponder can reply only to the identification request. If the aircraft transponder is a Mode C transponder, the transponder can reply to both the identification and altitude requests.

The Mode A and Mode C systems are unable to relay additional information or messages between the ground based secondary radar and the interrogated aircraft, other than the identification and altitude information. The Mode Select, or Mode S transponder provides additional capabilities over those available in Mode A and Mode C. Standards for Mode S communications are contained in the Radio Technical Commission for Aeronautics (RTCA) document, "Minimum Operational Performance Standards for Air Traffic Control Radar Beacon System/Mode Select (ARTCBS/Mode S) Airborne Equipment," RTCA/DO-181A, issued January 1992 and incorporated herein by reference.

In operation, a unique 24 bit address code, or identity tag, is assigned to each aircraft. Once per second, the Mode S transponder spontaneously and pseudo-randomly transmits, or "squitters," an unsolicited broadcast, including the specific address code unique to the aircraft carrying the transponder, via first one and then the other of its two omnidirectional antennas. Whenever the Mode S transponder is not broadcasting, it is monitoring, or "listening", for transmissions, including interrogation signals.

The unique 24-bit address code, or identity tag, assigned to each aircraft is the primary difference between the Mode S and Mode A/Mode C transponders. Interrogations are directed only to the particular aircraft using this unique address code and the replies are unambiguously identified. The unique address coded into each interrogation and reply also permits inclusion of data link messages to and/or from a particular aircraft.

The Traffic Alert and Collision Avoidance System (TCAS) is an airborne system that interacts with the Mode S and Mode A/C transponder system to alert the pilot of potential collision threats. The TCAS transmits interrogations which are received and replied to by other aircraft and used to determine the locations of other aircraft relative to own aircraft position. The TCAS system is described in RTCA document D0-185 entitled: "Minimum Operational Performance Standards for Air Traffic Alert and Collision Avoidance System (TCAS) Airborne Equipment", issued Sep. 23, 1983, consolidated Sep. 6, 1990 and in DO-185A, "Minimum Operational Performance Standards for Air Traffic Alert and Collision Avoidance System II (TCAS II) Airborne Equipment", dated December 1997 both of which are incorporated herein by reference.

Figure 1:
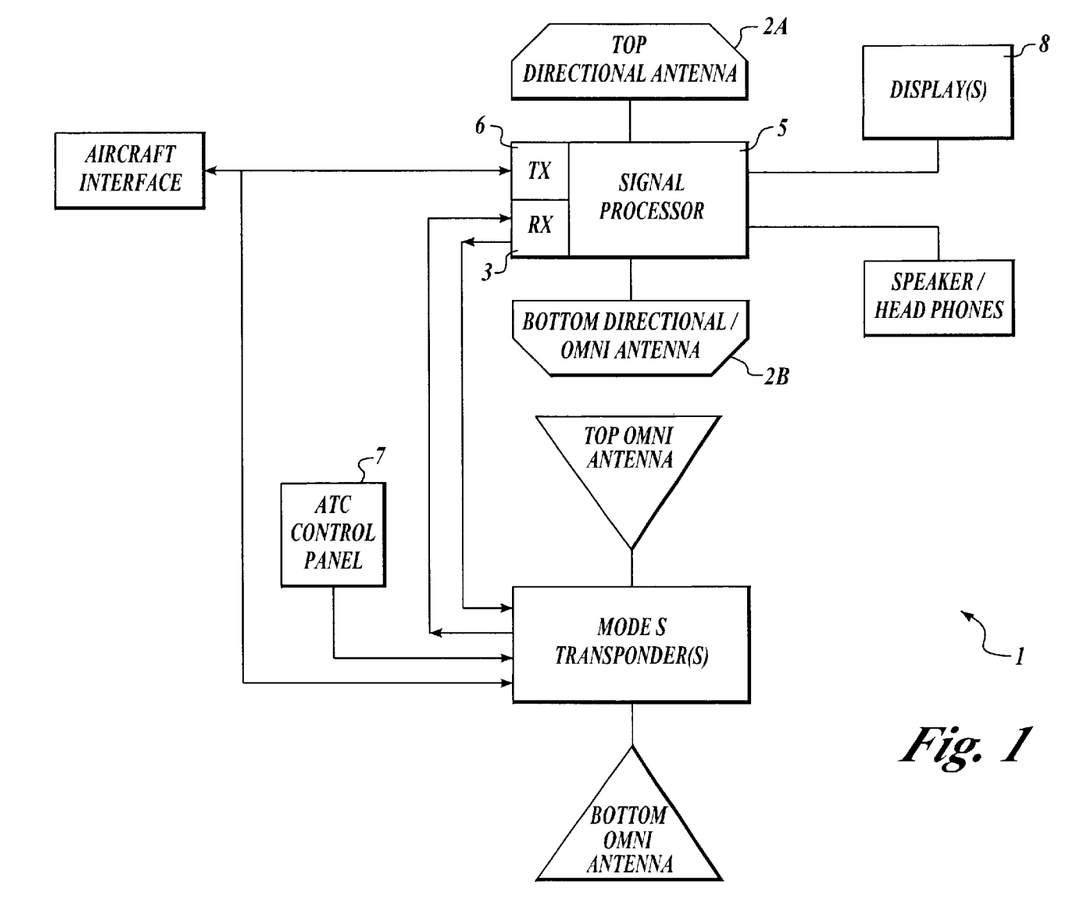
FIG. 1 is a block diagram of a TCAS system.

FIG. 1 illustrates one known embodiment of the TCAS system having 4-element interferometer antennae 2A and 2B coupled to a radio frequency receiver 3 of a TCAS processor 4. Receiver 3 is in turn coupled to a signal processor 5 operating known traffic alert and collision avoidance software. A radio frequency transmitter 6 is coupled to signal processor 5 for transmitting Mode S and Mode C interrogation signals. An associated control panel 7 for operating the TCAS system and a display 8 for displaying the TCAS information are each coupled to signal processor 5 of TCAS processor 4 as described in U.S. Pat. No. 4,855,748 and in co-pending U.S. application Ser. No. 09/369,752 entitled: "Multifunction Aircraft Transponder," filed Aug. 6, 1999, each of which is incorporated herein by reference.

Figure 2:
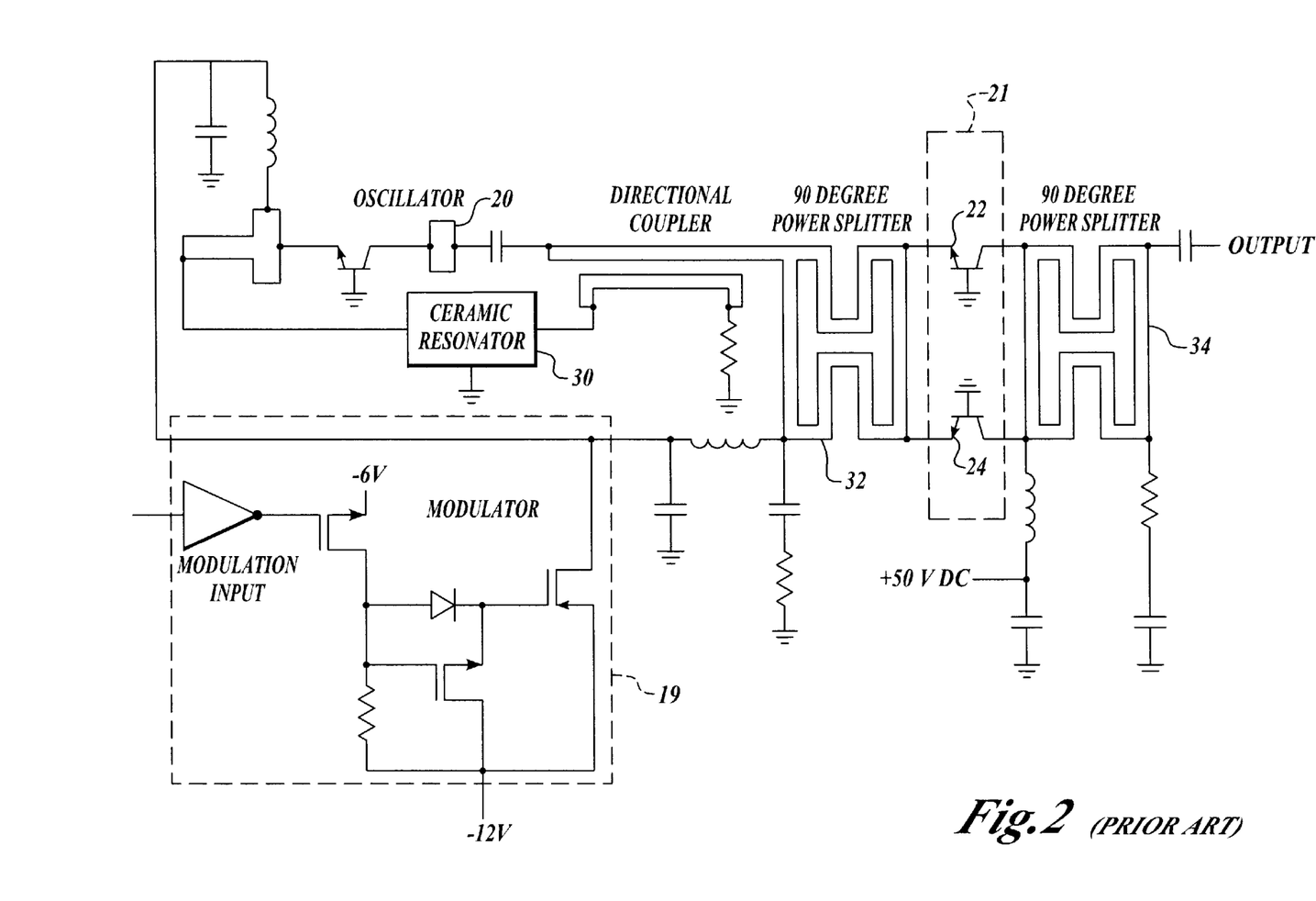
FIG. 2 is a circuit diagram of a prior art TCAS transmitter.

Transmitter 6 can consist of either a vacuum tube cavity oscillator or, more commonly, a solid state amplifier driven by an oscillator. The oscillator provides a radio frequency wave that is modulated by modulator 19. To satisfy reception requirements, the maximum output power of the transmitter is 1000 W. In typical designs, the TCAS must deliver nominally 250 W measured at the rear of the unit. FIG. 2 shows a typical Mode S transmitter and modulator in which an oscillator 20 drives an amplifier 21 composed of two zero bias Class C transistors 22 and 24. The difference between the output of amplifier 21 and the power delivered to the antenna accounts for subsequent losses at the transmitting antenna and intervening circuit components and ensures that sufficient output power is available at the transmitting antenna.

A ceramic resonator 30 preserves the frequency stability of the oscillator output. The output is additionally filtered to reduce or remove sideband harmonics which may be significantly amplified by amplifier 21 and subsequently received by other aircraft and confused with the true signal. The input signal from oscillator 20 is split into two signals separated by a phase angle of 90 degrees. Each output of power splitter 32 feeds one of transistors 22 and 24. The amplifier output is then supplied to a second power splitter 34 before being again filtered and supplied to one of antennas 2A and 2B.

One issue with use of the TCAS and secondary radar systems is that every Mode C/Mode A transponder that receives an interrogation signal replies. If the replies are received at the same time, or if portions of the reply signal overlap, the reply will be garbled. In addition, if an aircraft is interrogated by more than one ground facility or aircraft, a facility or aircraft other than the interrogator may receive the reply pulse. This unsolicited response is called FRUIT.

To minimize garble and FRUIT, the TCAS/transponder transmitter broadcasts the interrogation pulse using a technique called "whisper/shout." The "whisper/shout" technique uses a variable level attenuator to transmit the interrogation pulse at varying power levels. The sequence of variable power interrogations reduces the amount of garble that the receiving TCAS must process and reduces the amount of FRUIT added to the secondary radar system.

Figure 3:
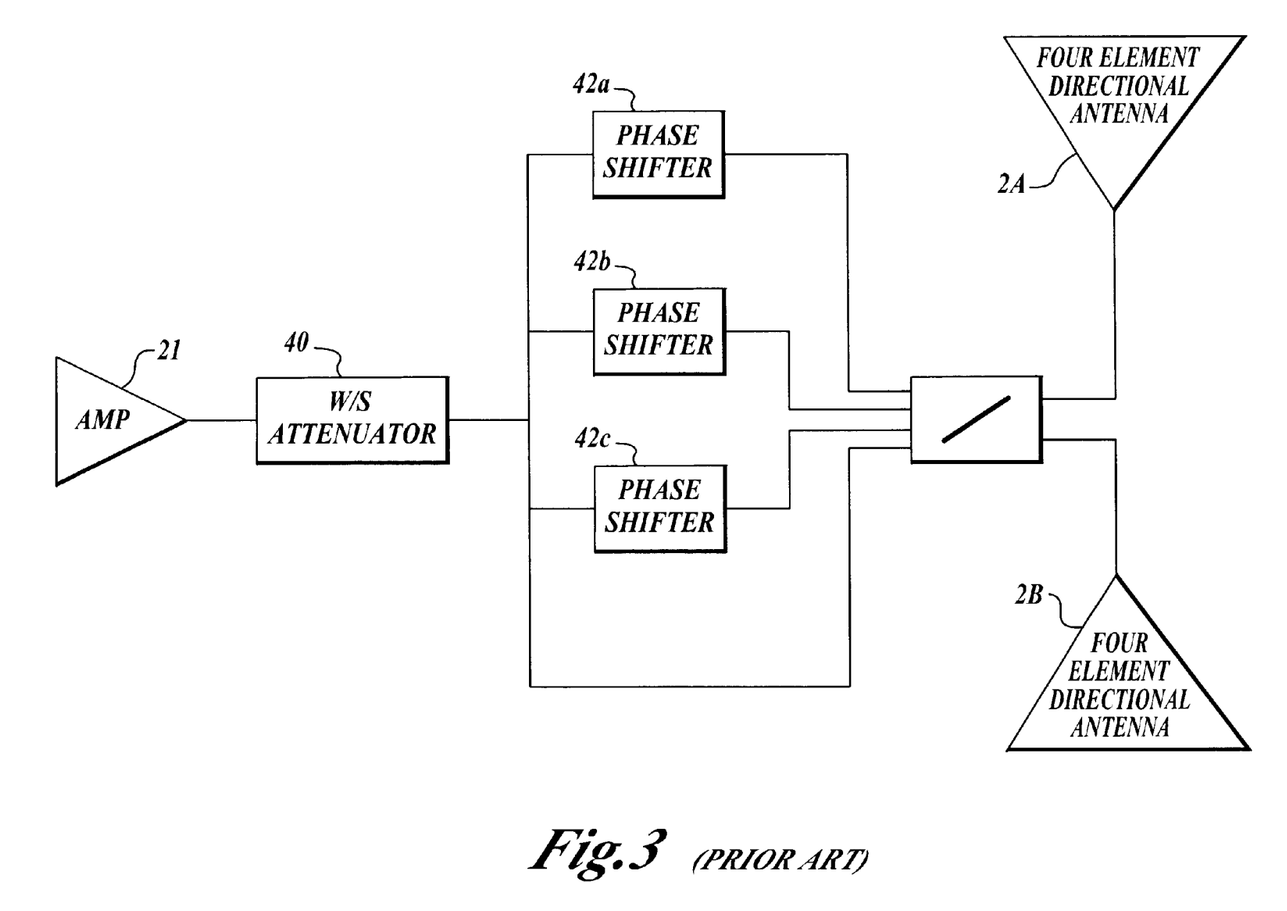
FIG. 3 is a block diagram of a prior art TCAS airborne transmission system.

FIG. 3 contains a block diagram of the TCAS transmitter device showing amplifier 21 and a whisper/shout attenuator 40. After the signal to be transmitted is amplified by amplifier 21 it is then sent to attenuator 40 and phase shifters 42a–42c before being broadcast from antennas 2A and 2B. Because attenuator 40 and phase shifters 42a–42c occur downstream of amplifier 21, these components must be sized to handle the up to approximately 600 W of power output by amplifier 21. In addition, much of the output power generated by amplifier 21 is then wasted by attenuator 40 when in the whisper mode. In addition, because the Class C amplifier contained within amplifier 21 does not amplify linearly, the amplifier will introduce some amplification of the radio frequency pulse harmonics. This unwanted amplification is called spectral regrowth and an output filter is required to minimize its generation. The Class C amplifier can also only be turned fully on or fully off.

BRIEF SUMMARY OF THE INVENTION

The present invention recognizes the problems inherent in the transmitter of the prior art. The present invention provides a TCAS and/or transponder transmitter that enables use of lower cost, smaller size components with fewer internal losses and which provides for more efficient amplification of the transmit signal.

According to one aspect of the present invention, the present invention includes a plurality of modulated radio frequency (RF) signal paths to be transmitted at the device antenna. A plurality of amplifiers are located in series along each of these signal paths. Each of the amplifiers is coupled to a control signal useful for activating the amplifier and/or for controlling the amount of amplification to be provided by that amplifier. In this manner, only the amount of amplification desired for that particular transmission need be provided. The present invention thus reduces the transmitter total power consumption as well as minimizing the cooling requirements of the device. Furthermore, the present invention thus provides the capability to deassert an entire transmission signal path. Such a capability is useful for isolating a faulty transmission path and/or to minimize signal leakage during times when a signal is being received. The distributed power channels therefore have the additional advantage that should a channel be faulty, or deasserted, the TCAS function can be performed by the remaining channels. Distributing the power across the plurality of signal lines also enables lower power and hence, smaller, less expensive components to be used on each of the signal paths.

According to another aspect of the present invention, the amplifiers arranged in series along each of the RF signal paths comprise linear Class A/B amplifiers. The linear amplification provided minimizes spectral regrowth and harmonics associated with the pulsed RF signal. The present invention thus eliminates the requirement for an output filter to remove these undesirable harmonics prior to transmission. The present invention thereby reduces the cost and complexity of the transmitter.

According to still another aspect of the present invention, the discrete amplification levels enable the transmitter to be constructed without the whisper/shout attenuator required in the prior art design. Optionally, a preferred embodiment of the present invention includes a programmable whisper/shout attenuator located upstream of the amplification circuit. The whisper/shout attenuator of the present invention thus operates at low power. The whisper/shout attenuator of the present invention can therefore be constructed as an integrated circuit or other surface mounted component and need not be sized for the high power loads found in the prior art designs. This feature also saves on the size, cost, weight and thermal efficiency of the transmitter. In addition, the whisper/shout attenuator of the present invention contributes to transmitter efficiency since the whisper/shout attenuator operates upstream of the signal amplifier and need not operate to dissipate the power generated during amplification of the signal as in the prior art device.

According to yet another aspect of the present invention, the present invention includes phase shifters on several of the RF signal paths upstream of the amplification. In a preferred embodiment, the phase shifters additionally comprise an IQ modulator, which in addition to controlling phase also permits control of signal amplitude. The design of the present invention also means that the phase shifters operate at low power levels and not at the high power levels found in the prior art devices. Thus, the phase shifters utilized in the transmitter of the present invention can include surface mounted integrated circuits, for example, of the type presently utilized in the cellular phone industry. The transmitter cost, complexity, size, weight and transmission path losses are thereby reduced over that found in the prior art.

Additional features and advantages of the present invention will be readily apparent from the detailed description and drawings as provided below.

DETAILED DESCRIPTION OF THE PREFERRED EMBODIMENTS

Figure 4:
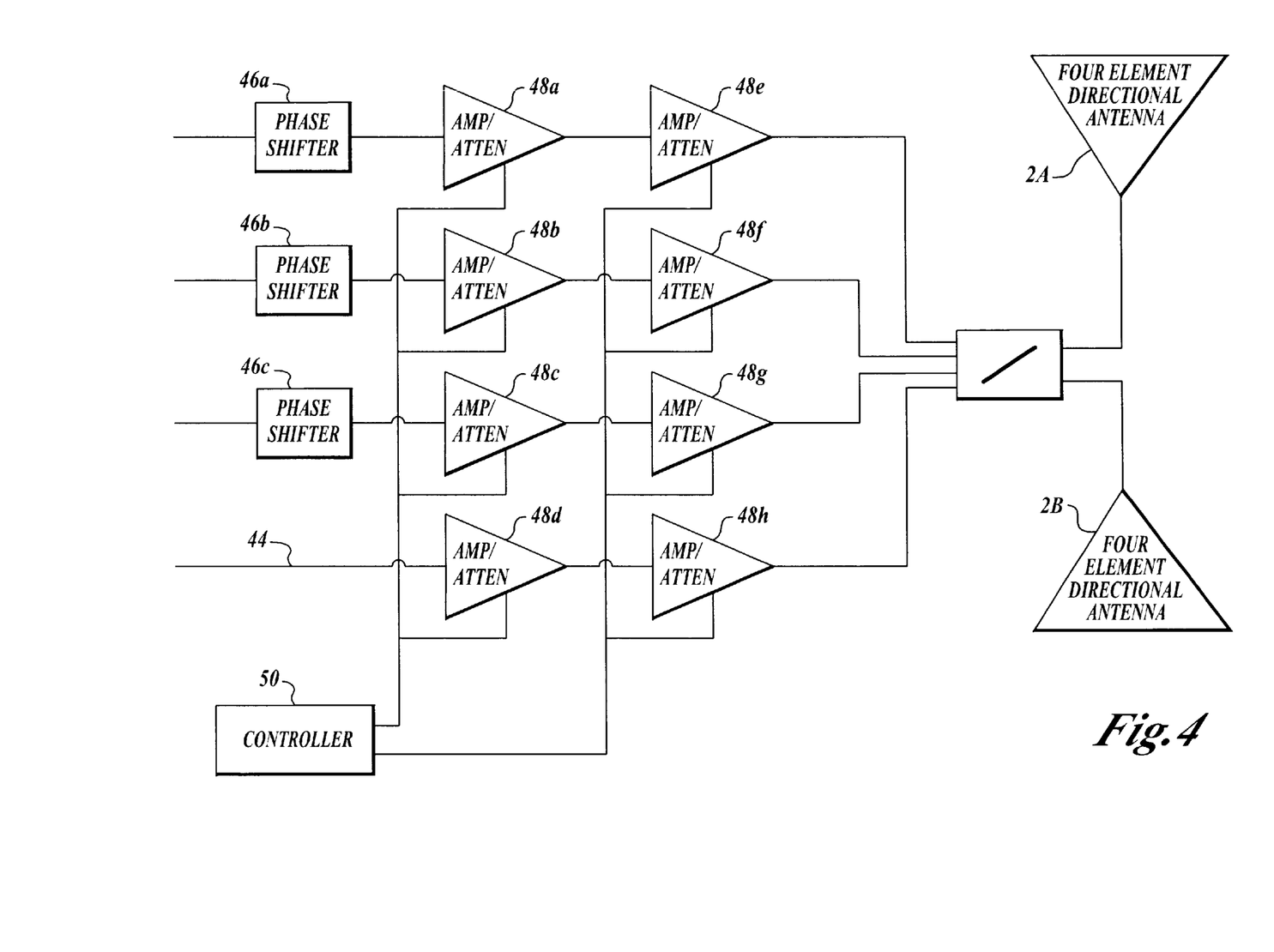
FIG. 4 is a conceptual block diagram of a TCAS/transponder transmitter according to a preferred embodiment of the present invention.

FIG. 4 is a top level, conceptual block diagram of a TCAS or transponder transmitter constructed according to a preferred embodiment of the invention. In the block diagram of FIG. 4, the signal is first phase shifted with respect to reference signal line 44 by phase shifters 46a–46c. The phase shifted and reference signals are then supplied to a plurality of linear amplifiers 48a–h, for example, Class A/B amplifiers arranged in series along each of the signal paths. In a preferred embodiment of the invention, each amplifier located along the signal path provides progressively more amplification. For example, amplifier 48a may provide up to +15 dB of amplification, while amplifier 48e provides up to +22 dB of amplification. Although only two amplifiers are shown in FIG. 4 for each of the signal paths, more may be used to obtain the desired output power. In a preferred embodiment of the invention, four stages of amplification are used. As shown in FIG. 4, the signal may also be attenuated prior to any significant amplifications.

A controller 50 supplies a controller signal to each of the amplifiers to individually activate amplifiers 48a–48e as desired and it supplies a control signal to each of the attenuators to individually control attenuation level. For example, to effectuate a whisper/shout interrogation transmission the attenuators on each channel are modified to change the interrogation strength of each pulse as required. Because the amplifiers 48a–48e are linear the relative power attenuation between pulses of the interrogation is maintained and the absolute power level amplified. Individually controlling amplifiers 48a–48e in the manner described eliminates the need for the whisper/shout attenuator of the prior art. Optionally, as to be described in greater detail below, the present invention may include a whisper/shout attenuator prior to any significant amplification of the signal. The present invention therefore conserves power over the prior art design since the signal need not first be amplified to full power and then attenuated. The present invention thus also minimizes the thermal load of the device and reduces cooling requirements over the prior art design.

Controller 50 may comprise a programmable logic device. When controller 50 comprises a programmable device, the control signals to be output by controller 50 may be determined by writing instructions or logical operations to controller 50 via a general purpose processor. When the invention is implemented as part of a TCAS device, the TCAS general purpose is one such processor useful for writing such instructions or logic to controller 50. Controller 50 may optionally comprise a general purpose processor, a microelectronic circuit, firmware, software or other executable code.

According to one embodiment of the invention, controller 50 may additionally be used to independently activate each of the signal lines. This feature enables a line to be "off" and so no signal is amplified on that line thereby preventing signal leakage to the antenna when the device is in the receive mode. This feature additionally permits a faulty signal path to be isolated such that that line need not be utilized during signal transmission.

The present invention additionally relieves the design requirements placed on phase shifters 46a–46c. Unlike in the prior art design, the signal is first phase shifted and then amplified, meaning that lower power, lower cost, smaller form factor parts can be used in lieu of the larger circuits of prior art design. According to a preferred embodiment of the invention, integrated circuits readily available and used in the cellular phone industry, are used for the phase shifters 46a–46c of the present invention.

Figure 5A:
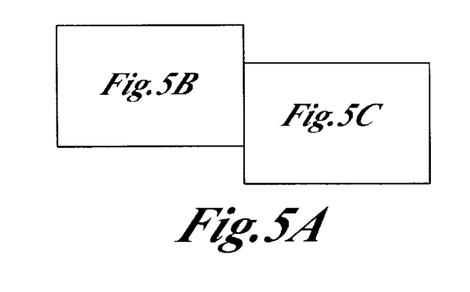
FIGS. 5A–5C is a top level circuit diagram of a TCAS transmitter according to a preferred embodiment of the invention.
Figure 5B:
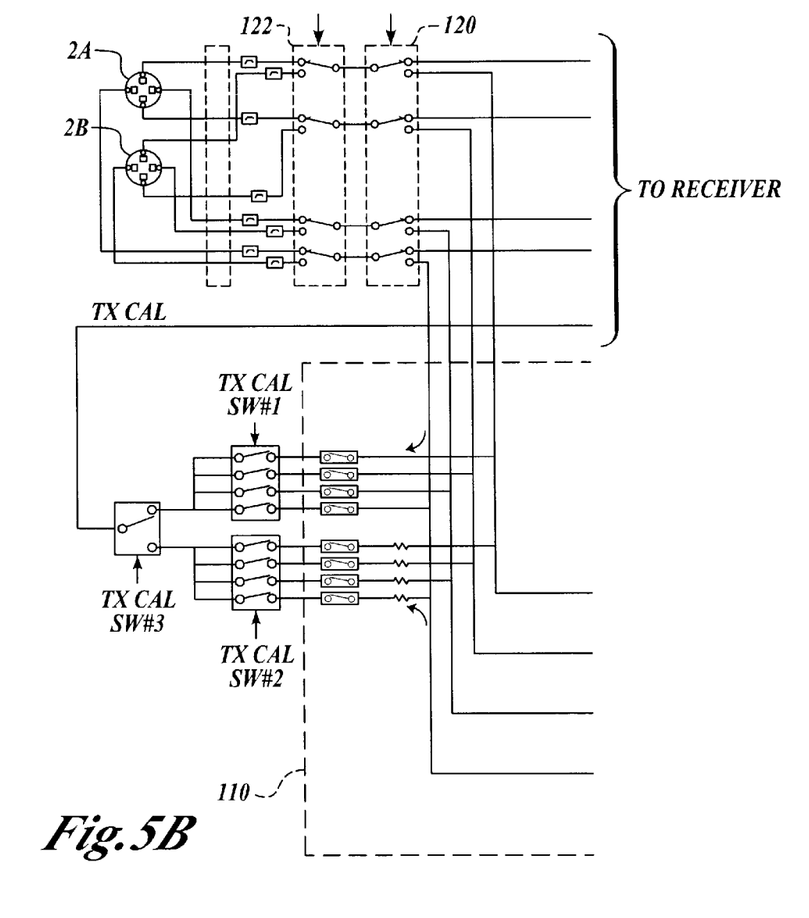
Figure 5C:
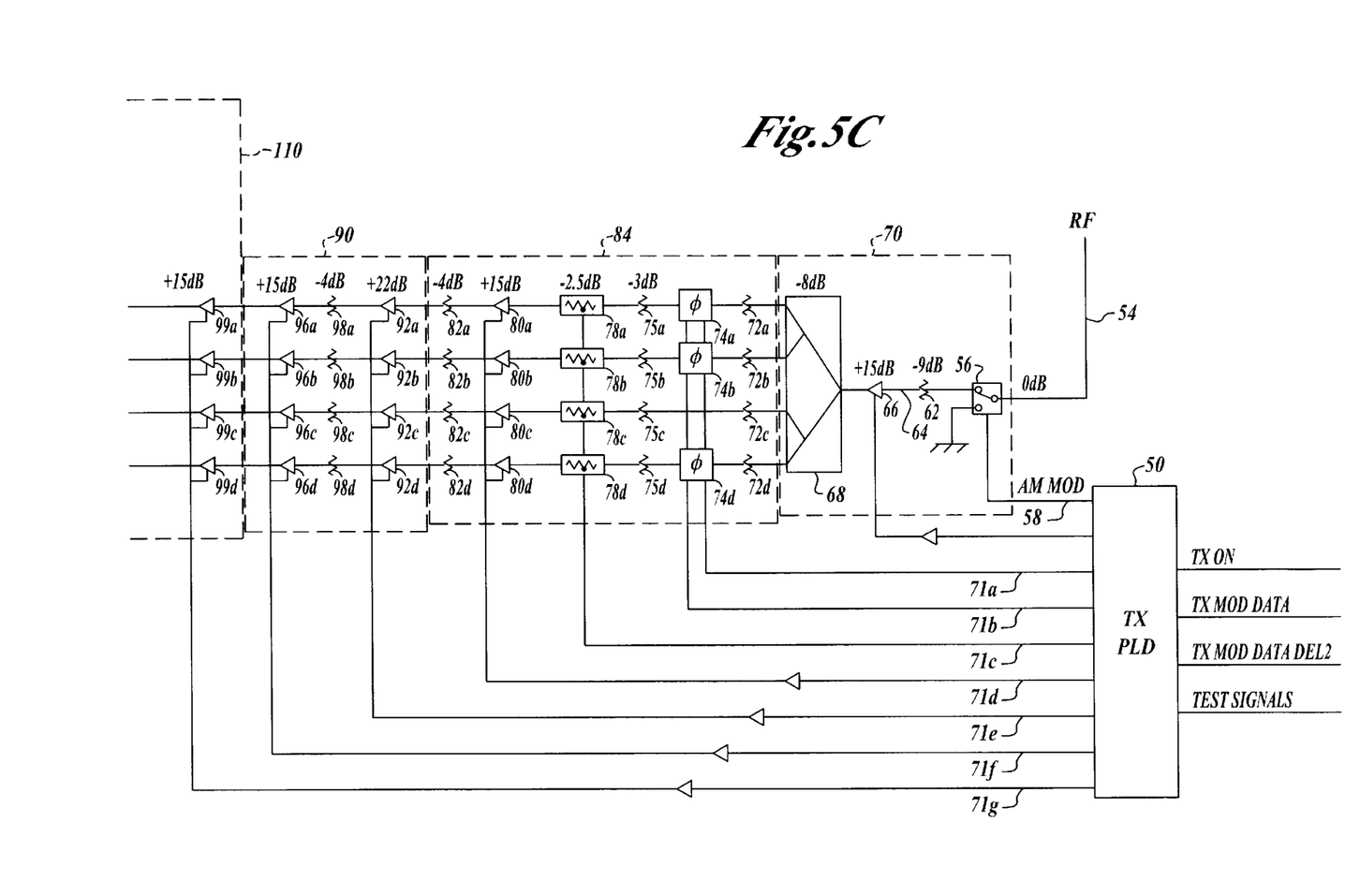

FIGS. 5A–5C contain a top level circuit diagram of the TCAS or transponder transmitter of the present invention showing the components of FIG. 4 in greater detail. FIG. 5A shows the relationship and interconnection between the drawings of 5B and 5C. In FIG. 5B, a RF signal 54 is supplied to a switch 56. Switch 56 opens and closes in response to signal AM MOD received on line 58 from controller 50. Switch 56 thus operates in combination with resistance circuit 62 to create the ATCRBS and/or Mode S and/or TCAS interrogation signals by switching the RF modulated signal onto line 64.

Figure 6:
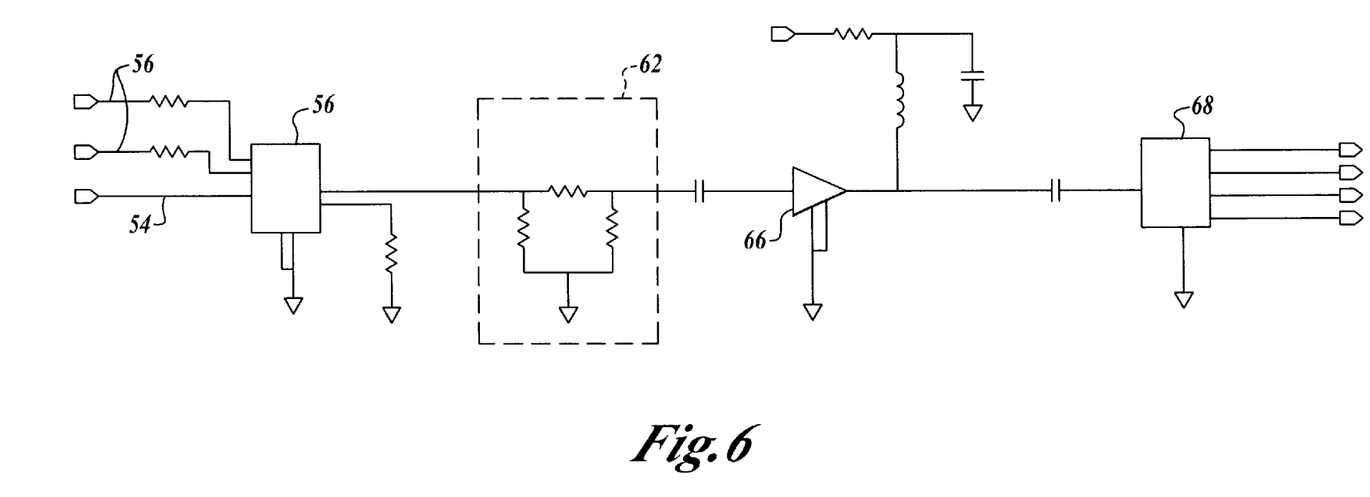
FIG. 6 is a circuit diagram illustrating the RF modulation and power splitter portions of FIG. 5B in greater detail.

As known to those of skill in the art, TCAS interrogations of Mode S transponders require that the signal also be modulated in phase using digital phase shift laying (DPSK). The transmitted signal is shifted by 0 or 180 degrees to communicate a 1 or a zero respectively. The DPSK modulation can be accomplished by implementing a phase shift function, as known to those of skill in the art, upstream of switch 56 of FIG. 5B. The resulting modulated signal pulses 64 are then amplified by an optional amplifier 66 before being supplied to a four way power splitter 68. Because power splitter 68 is placed ahead of any significant amplification of the transmitted RF signal, power splitter 68 may be constructed as a low power component thereby saving weight, size, and cost over prior art designs. In a preferred embodiment of the invention, power splitter 68 comprises an integrated circuit part no. 4A-4305 manufactured by Anaren Microwave, Inc., Kirkville Rd., Syracuse, N.Y. In a preferred embodiment of the invention, operation of amplifier 66 may be controlled by controller 50. Controlling amplifier 66 to operate only when a signal is to be transmitted conserves power and reduces the thermal load of the device. FIG. 6 contains a more detailed circuit diagram of the elements described above and contained in block 70 of FIG. 5B.

After exiting power splitter 68, the modulated RF signal is split equally among four signal lines as shown in FIG. 5B. According to the present invention, these four signal lines may be individually amplified and controlled by four line signal busses 71a–71b in a manner to be described in greater detail below. Splitting the signal has the advantage that should a channel become faulty, or deasserted, the TCAS function can be performed by the remaining channels. Furthermore, since the signal has been split into a plurality of signals, the total power generation requirement of each signal path is reduced, thereby enabling the use of lower power, smaller size, higher reliability components on each of the signal paths.

Each of the four signals output by power splitter 68 are first attenuated by resistance circuits 72a–72d. The attenuation provided by circuits 72a–72d provides interstage isolation and serves to balance and condition the signals prior to further processing by phase shifters 74a–74c. The phase shifters balance the phase between the four signal paths. If the phase is not balanced, the individual signal paths can cancel each other out when transmitted at the antenna. In one possible embodiment of the invention, only three phase shifters are used, since one of the four RF signal lines may serve as the reference line. Optionally, four phase shifters may be used. When four phase shifters are used, DPSK modulation can be accomplished through use of these phase shifters and the traditional DPSK modulator which exists upstream of switch 56 can be omitted. Phase shifters 74a–74c function as transmit leveling devices that permit variations in the amplitude and phase of the signals appearing on each of the four RF signal lines. In a preferred embodiment of the invention, the phase shifters are an IQ modulator that in addition to controlling phase also controls amplitude. The IQ modulator also enables attenuation of the signal which balances the power level in the four signal lines. Phase shifters 74a–74c are controlled by control signals 71a and 71b. Line 71a comprises a three line bus that activates each of phase shifters 74a–74c according to a control signal output by controller 50. Line 71b comprises a three line bus that controls the amount of phase shift provided by each of phase shifters 74a–74c according to a signal output by controller 50.

Since phase shifters 74a–74c are located upstream from any significant amplification of the modulated RF signal, low power phase shift components can be utilized in the transmitter of the present invention. In a preferred embodiment of the invention, phase shifters 74a–74c, comprise surface mounted integrated circuits. Such circuits are currently used for example, in low power applications such as cellular telephones. For example, a part number RF 2480 integrated circuit manufactured by RF Micro Devices, Inc., Greensboro, N.C., is suitable for use with the present invention. The present invention thus provides several advantages of the prior art design by saving on weight, size, power consumption and cost as well as reducing the thermal output of the circuit.

After passing through phase shifters 74a–74c, the signal is again leveled by a resistance circuit attenuator 76a–76d, prior to be input to programmable whisper/shout attenuators 78a–78d respectively. The programmable whisper/shout attenuator preferably comprises an integrated circuit which receives a control signal 71c from controller 50 that establishes the level of attenuation for each of the four RF modulated signal lines. In the present invention, four discrete levels of attenuation are preprogrammed into each of attenuators 78a–78c. In a preferred embodiment of the invention, attenuators 78a–78d, each comprise a programmable integrated circuit, for example part number AT-263, manufactured by M/A.COM of Lowell, Mass. Other programmable attenuation circuits known to those of skill in the art may optionally be used with the present invention. Use of the programmable integrated circuit of the present invention permits use of a commercially available, low power component and eliminates the high power whisper/shout attenuator of the prior art design. The present invention thus provides a more efficient circuit, reduces the amount of total power generation required, reduces the heat generated by the transmitter, and thereby saves on space, weight and cost over the prior art design.

The modulated RF is next sent to a first amplification stage for amplification by one of amplifiers 80a–80d. Each of amplifiers 80a–80d is individually controlled by a control signal output by controller 50 on four line signal bus 71d. In apreferred embodiment of the invention, each of amplifiers 80a–80d comprises a linear, for example, but not limited to a Class A/B, amplifier in lieu of the nonlinear Class C amplifiers used in the prior art design. The linearity of the Class A/B amplifier limits spectral regrowth. Spectral regrowth is the undesirable amplification of harmonics of the RF signal pulse. The linearity of Class A/B amplifier therefore allows for the phase shift and attenuation early on in the transmitter lineup at low power levels. The linear Class A/B amplifier also allows for pulse shaping which in turn enables control of the TCAS transmit or interrogation spectrum without the use of expensive (cost, size, weight) output filters. According to the present invention, up to 15 dB of amplification is provided by the first amplification stage.

Figure 7:
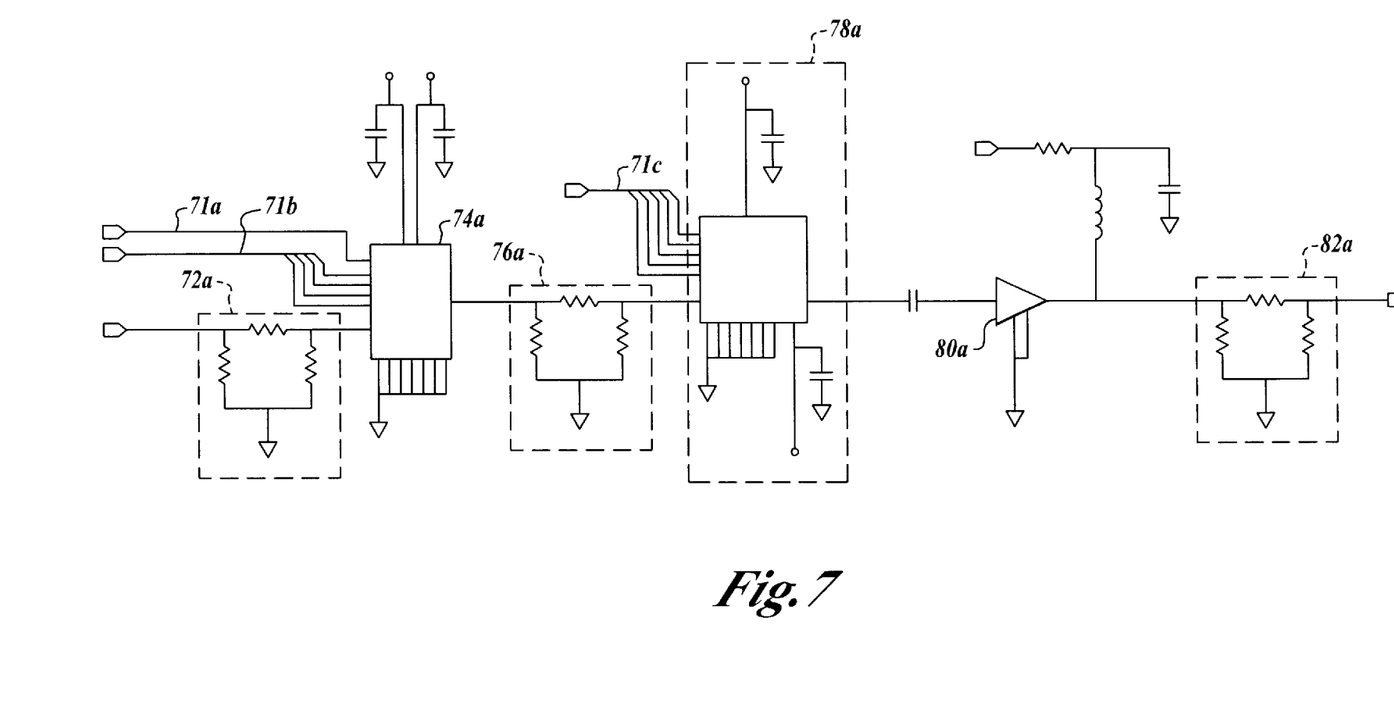
FIG. 7 is a circuit diagram illustrating the phase shifter, programmable whisper/shout attenuator and first stage amplification of the modulated RF signal of FIG. 5B in greater detail.

FIG. 7 illustrates in greater detail the circuit elements described in the preceding paragraphs and located in block 84 of FIG. 5B. The circuit drawing of FIG. 7 includes a representative single line of the four RF modulated lines shown. Note that a phase shifter such as that shown by reference numeral 72a would preferably be omitted on one of the four RF signal paths for the reasons stated above.

Figure 8:
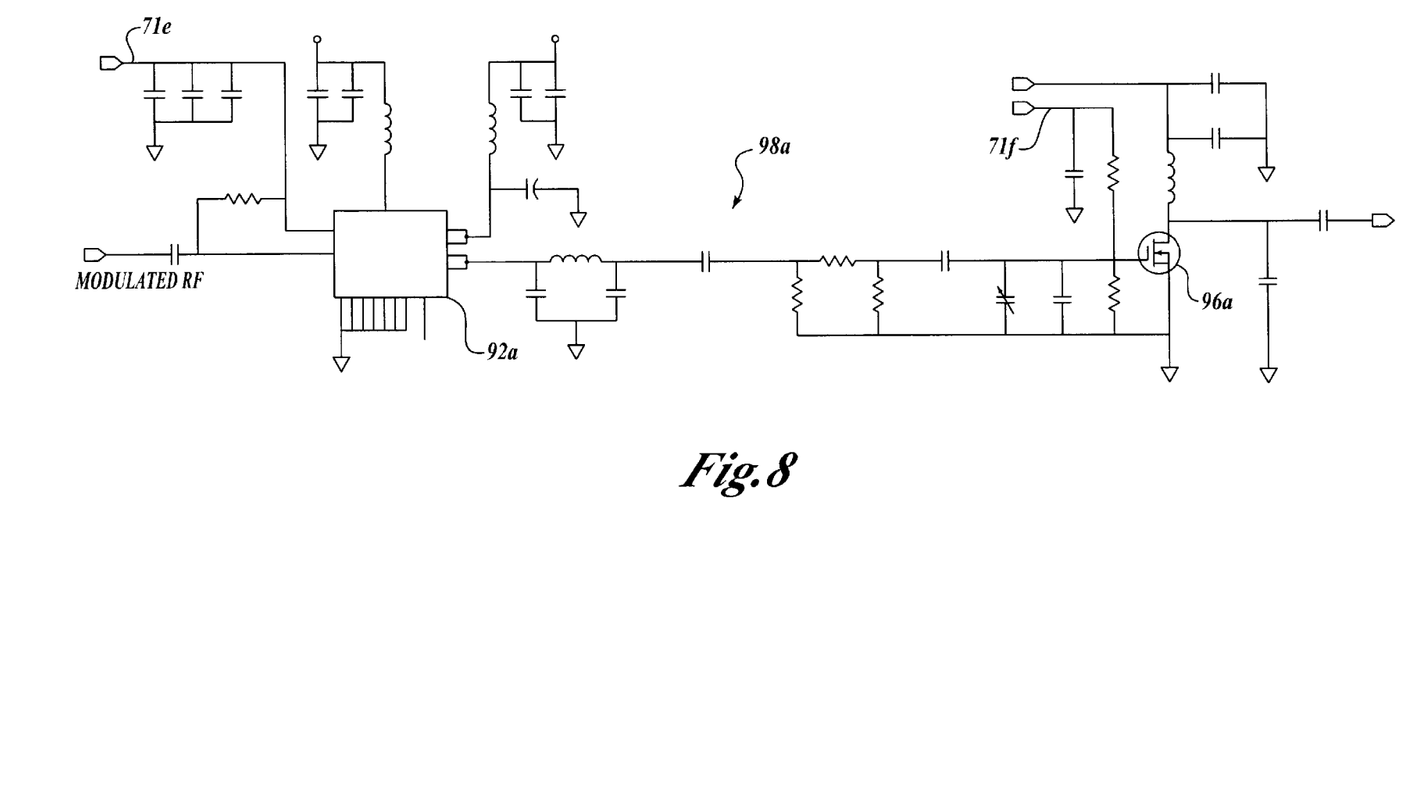
FIG. 8 is a circuit diagram illustrating in greater detail the second and third stage amplification of the modulated RF signal of FIG. 5B.

FIG. 8 provides a more detailed drawing of the second and third amplification stages shown in block 90 of FIG. 5B. As in FIG. 7, only a single modulated RF line is shown for simplification. Each of the remaining RF signal paths are similar in construction to that shown in FIG. 8. In the embodiment of FIG. 8, the modulated RF signal is again amplified by a second amplification stage 92a. Amplification stage 92a comprises a linear Class A/B is amplifier. According to a preferred embodiment of the invention, amplifier 92a comprises an integrated circuit amplifier, for example, part number RF 2132 manufactured by RF Micro Devices. Amplifier 92a is controlled by control signal 71e output by controller 50. Signal 71e controls activation of amplifier 92a and the amount of amplification provided.

A third amplifier stage, comprised primarily of field effect transistor (FET) 96a further amplifies the modulated RF signal according to control signal 71f. FET 96a and associated circuitry also comprise a linear Class A/B amplifier. Disposed between the second and third amplification stages is a resistance/capacitance circuit 98a which functions to level and condition the modulated RF signal prior to amplification by amplifier 96a.

Figure 9:
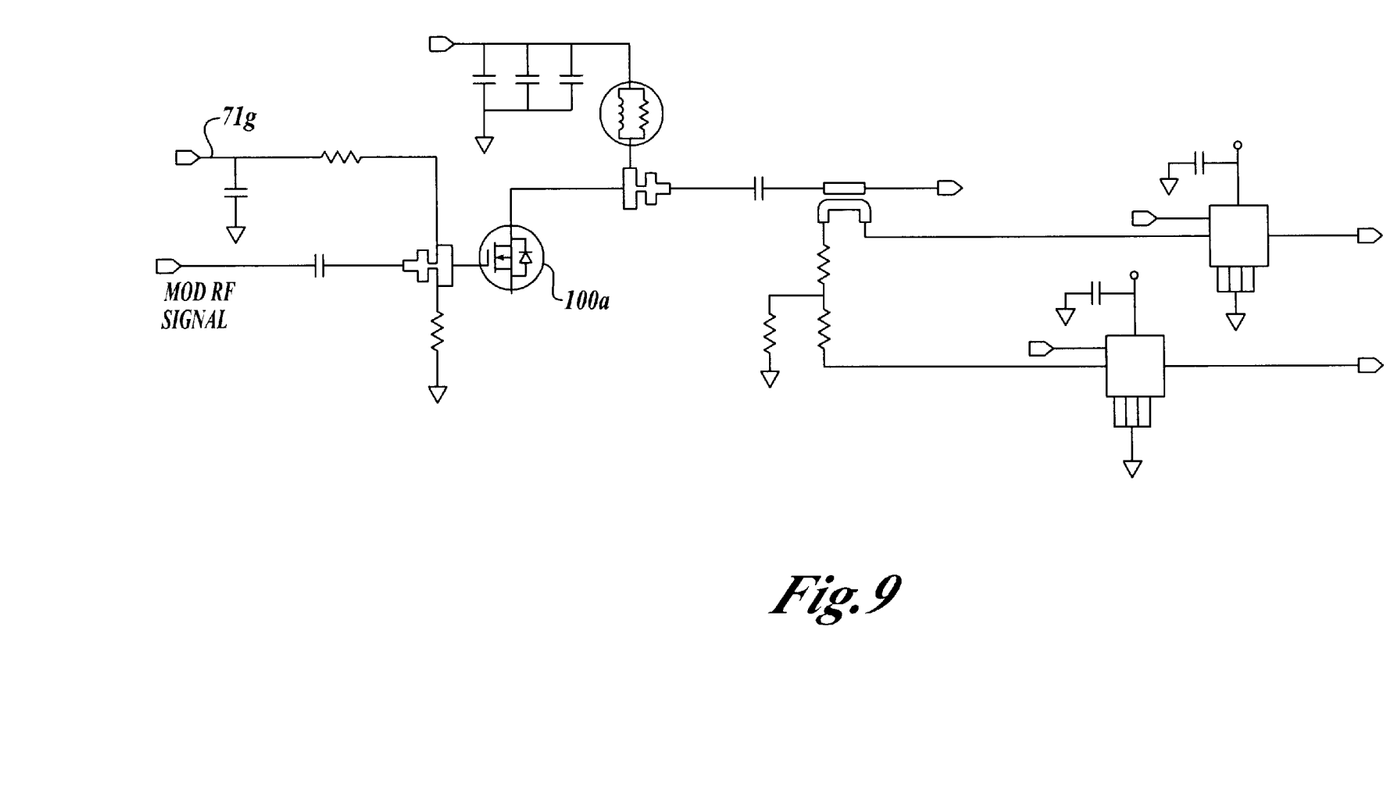
FIG. 9 is a circuit diagram illustrating in greater detail the fourth stage amplification of the modulated RF signal of FIG. 5B.

FIG. 9 shows the fourth stage of amplification as indicated by amplifiers 99a–99d of FIG. 5B. In the embodiment of FIG. 9, the modulated RF signal is amplified by a linear Class A/B amplifier circuit including an FET 100a. Amplifier 99a receives a control signal 71g from controller 50 which activates amplifier 99a and controls the amount by which the modulated RF signal is amplified. FIG. 9 also includes a more detailed circuit drawing of the antenna coupling system components contained in region 110 of FIGS. 5B–5C. The antenna coupling circuit of region 110 does not form part of the presently claimed invention but operates to enable reception of the transmitted signal by the receive circuit (not shown). This process permits fault detection in the antenna elements or signal paths leading to the antenna as well as enabling calibration of the transmitted signal.

The amplified modulated RF signal exits block 110 of FIG. 5C and is coupled to antennas 2A or 2B for transmission. A transmit and receive switch 120 couples the antenna elements to either the receiver or to the transmitter. A top/bottom switch 122 couples the transmit and receive lines to either the top antenna 2A or bottom antenna 2B.

The present invention has now been described with reference to the preferred embodiments. Variations and modifications will be readily apparent to those of ordinary skill in the art. For example, although the embodiment of FIGS. 5A–5C describes a TCAS transmitter, it will be readily apparent to those of skill in the art that the present invention may be used with a transponder. In the transponder design the whisper/shout attenuator and phase shifters can be omitted. The transponder also typically transmits and receives from a single blade antenna at a predetermined power level. However, the distributed power architecture of the present invention permits precise control and provides robustness to the transponder transmitter. Furthermore, the distributed architecture of the present invention does not require the expensive output filter found in prior art designs. For at least these reasons, the invention is to be interpreted in light of the claims.

What is claimed is:

1. A method for amplifying one of a transponder or TCAS signals for subsequent transmission through a phased-array antenna, the method comprising the steps of:

receiving one of a transponder or TCAS signal to be transmitted;

splitting the signal into a plurality of signals, each on a distinct signal line;

passing each signal through a plurality of amplifiers arranged in series on the signal line;

phase delaying each of the signals suitably to energize an element of a phased-array antenna; and using a control signal to control a power level of said plurality of amplifiers whereby a total amplification of said signal is determined.

2. The method of claim 1 wherein said step of passing said signal through a plurality of amplifiers comprises the step of passing said signal through a plurality of Class A/B amplifiers.

3. An amplifier stage for a TCAS transmitter comprising:

an input for receiving a TCAS signal to be transmitted;

a signal splitter configured to split the TCAS signal received at the input into a plurality of split signals, each of the split signals having a phase;

a phase shifter configured to shift the phase of each of the split signals such that the split signals have a suitable phase to energize a phased-array antenna;

a plurality of amplifiers arranged in series for amplifying said TCAS signal; and a controller coupled to at least one of said plurality of amplifiers for controlling a power level of said amplifier.

4. The amplifier stage of claim 3 wherein said plurality of amplifiers comprise linear Class A/B amplifiers.

5. The amplifier stage of claim 3 wherein said controller comprises a programmable logic device.

6. The amplifier stage of claim 3 further comprising a whisper/shout attenuator disposed between said input and said plurality of amplifiers.

7. The amplifier of stage of claim 6 wherein said whisper/shout attenuator comprises a programmable integrated circuit.

8. An amplifier stage for a transponder transmitter comprising:

an input for receiving a signal to be transmitted;

a signal splitter configured to split the signal received at the input into a plurality of split signals, each of the split signals having a phase;

a phase shifter configured to shift the phase of each of the split signals such that the split signals have a suitable phase to energize a phased-array antenna;

a plurality of amplifiers arranged in series for amplifying said signal; and a controller coupled to at least one of said plurality of amplifiers for controlling a power level of said amplifier.

9. The amplifier stage of claim 8 wherein said plurality of amplifiers comprise linear Class A/B amplifiers.

10. The amplifier stage of claim 8 wherein said controller comprises a programmable logic device.

11. A TCAS transmitter for transmitting a TCAS signal from an airborne phased-array antenna comprising:

an input for receiving a TCAS signal to be transmitted;

a power splitter for splitting said TCAS signal onto a plurality of signal lines;

a phase shifter on each signal line introducing a distinct phase-delay;

a plurality of linear amplifiers arranged in series on each of said signal lines;

a controller coupled to at least one said plurality of amplifiers for controlling a power level of said amplifier; and an output wherein said signal lines are coupled to the antenna.

12. The TCAS transmitter of claim 1, where the phase shifter, further shifts the signal phase suitably to energize a distinct element of the phased-array antenna corresponding to the signal line.

13. The TCAS transmitter of claim 11 wherein said controller comprises a programmable logic device.

14. The TCAS transmitter of claim 11 wherein said power splitter comprises an integrated circuit.

15. The TCAS transmitter of claim 11 further comprising at least one whisper/shout attenuator located on at least one of said signal lines and disposed between said plurality of amplifiers and said power splitter.

16. The TCAS transmitter of claim 15 wherein said whisper/shout attenuator further comprises an integrated circuit.

17. The TCAS transmitter of claim 15 wherein said whisper/shout attenuator is programmable.

18. The TCAS transmitter of claim 17 wherein in said whisper/shout attenuator is coupled to receive an attenuator control signal from said controller.

19. The TCAS transmitter of claim 12 wherein said phase shifter comprises an integrated circuit.

20. The TCAS transmitter of claim 12 wherein said phase shifter comprises an IQ modulator.

21. The TCAS transmitter of claim 12 wherein said phase shifter is disposed between said power splitter and said plurality of amplifiers.

22. The TCAS transmitter of claim 12 wherein a phase shifter is located on each of said plurality of signal lines.

23. The TCAS transmitter of claim 22 wherein said phase shifters operate to perform DPSK modulation of said TCAS signal.

24. The TCAS transmitter of claim 11 wherein said plurality of amplifiers comprise Class A/B amplifiers.

* * * * *